United States Patent

[11] 3,629,586

[72] Inventor Alan Frederick Giles
 Wembley, Middlesex, England
[21] Appl. No. 821,601
[22] Filed May 5, 1969
[45] Patented Dec. 21, 1971
[73] Assignee Lever Brothers Company
 New York, N.Y.

[54] APPARATUS FOR MEASURING THE MASSES OF A SERIES OF ARTICLES SPACED APART BY MODULES HAVING A SUBSTANTIALLY CONSTANT RADIATION ABSORPTION CHARACTERISTIC
8 Claims, 1 Drawing Fig.

[52] U.S. Cl. ................................. 250/83.3
[51] Int. Cl. ................................. G01t 1/16
[50] Field of Search .......................... 250/43.50, 83.30

[56] References Cited
UNITED STATES PATENTS
3,001,076 9/1961 Crump ...................... 250/83.6
3,259,746 7/1966 Blunt ........................ 250/83.3

Primary Examiner—James W. Lawrence
Assistant Examiner—Davis L. Willis
Attorneys—Louis F. Kline, Jr., Melvin H. Kurtz and Edgar E. Ruff ABSTRACT: A method and apparatus in which the masses of a series of spaced articles are scanned by radiation, e.g., Gamma radiation, and a detector produces an output dependent on the masses of the articles, the output being continuously calibrated by reference to the average value of the measured masses of spacing modules between the articles.

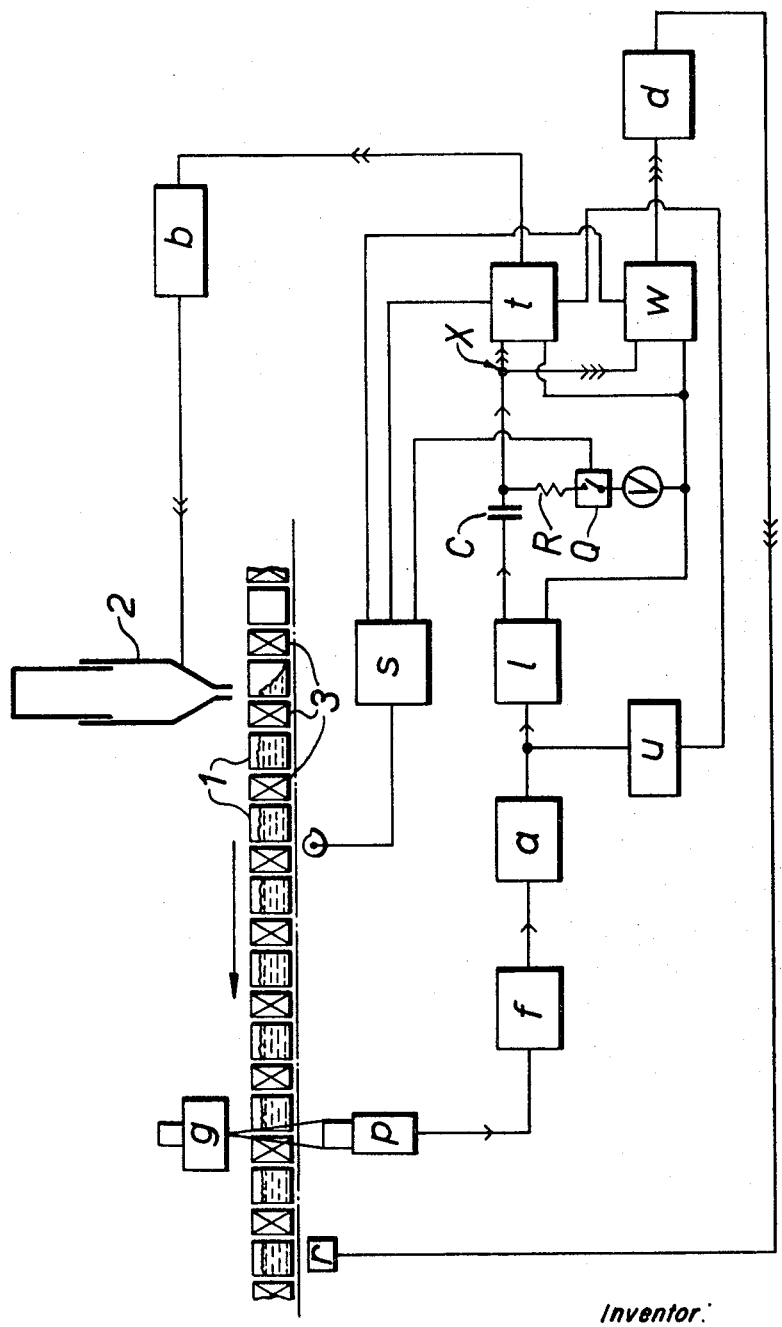

APPARATUS FOR MEASURING THE MASSES OF A SERIES OF ARTICLES SPACED APART BY MODULES HAVING A SUBSTANTIALLY CONSTANT RADIATION ABSORPTION CHARACTERISTIC

The present invention is concerned with methods and apparatus for the measurement of physical properties such as mass or weight, and in particular to the check weighing, weight recording, weight monitoring and/or weight trend control of successively filled or formed articles such as cartons of powder, blocks of margarine, containers of liquid or particulate material or any other packaged or unit commodities which will be packed as a series of spaced units on a conveyor line. The invention is particularly, but not exclusively, concerned with the problem of adapting existing volumetric filling lines to operate on a more accurately controlled weight basis.

It is known to use radiation absorption measuring equipment for various density measuring purposes on an industrial scale, but despite this, such equipment is not normally used in practice for accurate weight measurements of the type mentioned above since it has been generally believed that the inherent deficiencies of the equipment for example in respect of source decay and detector temperature sensitivity outweighed any advantages that might be obtained from the equipment.

The present invention provides methods and apparatus for determining mass or weight, in which the effect of these inherent deficiencies is reduced by making use of the fact that the articles to be weighed are spaced apart.

Accordingly, one aspect of the invention provides an apparatus for measuring the masses of a series of articles in which the articles to be measured are spaced by spacing modules of substantially constant radiation absorption characteristics, the apparatus comprising a radiation source and a detector for producing signals dependent on the radiation absorption of the articles and spacing modules as they are scanned by being passed sequentially through a beam of radiation between the source and detector, and signal processing means which is adapted to make comparison between the signal due to an article when scanned by said beam and the average value of a plurality of the signals due to spacing modules previously scanned by said beam, and thereby to obtain an output value dependent on the mass of said article. Preferably the signal processing means is arranged to provide said average value by averaging the signals due to at least the three spacing modules scanned immediately previously to the articles being measured. In practice averaging will probably be taken over 10 or more spacing modules in most embodiments of the invention.

It will thus be appreciated that the invention enables the equipment to be continuously standardized in a simple and effective manner, so counteracting the effects of source delay, and detector sensitivity variations.

The spacing modules may be blocks of solid material such as metal, e.g., aluminum situated between the articles and preferably should have absorption characteristics of a similar order to the articles being measured. This latter feature tends to give greater accuracy to the measurements and makes detection of grossly inaccurately measured articles simpler, and hence makes it easier to reject such articles if desired. It is, however, not always essential to use blocks of solid material as the spacing modules, it being possible in some cases to operate using spacing modules constituted mainly or entirely by airgaps between the articles. It should be noted that in practice many volumetric filling machines have spaces, e.g., the aluminum spacers referred to above, between the articles being filled and such spaces can constitute the spacing modules used in the present invention. Thus, the present invention enables such volumetric filling machines to be readily converted to be controlled by weight.

In the preferred mode of operation the effective part of the beam of radiation, i.e., that part which falls on the detector, will tend to be narrower than either the articles or spacing modules in their direction of relative travel, and in consequence the said output value dependent on the mass of each article will be a value appropriate to the mass per unit length in the direction of relative travel of the articles. This value can then be converted by a summing operation over the relative travel of the article to a value appropriate to the total mass of the article.

Another consequence of using an effectively narrow beam is that the length of the spacing modules in the direction of travel of the articles is, apart from synchronization, immaterial provided the average radiation absorption characteristics of that part of each spacing module which is in the beam at any one time remains substantially the same, and the term "spacing modules of substantially constant radiation absorption characteristics" is intended to include this situation.

Preferably the signal processing means comprises devices for obtaining the logarithm of said article signal and the logarithm of the average value and for obtaining the difference between said logarithms thereby to obtain an output value directly proportional to the mass of the article. The logarithm of the average value may be obtained by averaging the spacer module signal and then obtaining its logarithm or by first obtaining the logarithms of successive spacing module signals and then averaging these.

The signal processing means may comprise an RC circuit in which the signals due to spacing modules are arranged to be impressed across a storage capacitor via a charging resistor to obtain the said average value as a voltage across said capacitor.

When the signal processing means is arranged to obtain the difference between the logarithms of the article signal and the average value and comprises an RC circuit for obtaining the average value, the apparatus may comprise a switching device for disconnecting the charging resistor from the RC circuit during scanning of an article to obtain, as a voltage across said storage capacitor, the difference between these logarithms.

A preset voltage source may be provided which is arranged to be added to the voltage across said storage capacitor via the charging resistor while obtaining said average value voltage, to allow for calibration of the output signal. Thus, variations in the geometry or in the absorption characteristics of the spacing modules or articles can be taken account of, and any desired value of zero offset in the output signal be obtained.

The invention also provides a signal processing device for use in accordance with the invention and a method of measuring the masses of a series of articles.

A method of measuring the masses of a series of articles in accordance with the invention is thus provided in which the articles, while spaced by spacing modules of constant radiation absorption characteristics, are scanned by being passed relatively through a beam of radiation between a radiation source and a detector so that said detector produces signals due to the successive articles and spacing modules, and in which the signal due to each article is compared with the average value of a plurality of signals due to spacing modules previously scanned by the beam, so as to obtain an output value dependent on the mass of said articles.

It will be appreciated that in most cases relative movement between the articles and the radiation source and detector will be effected by movement of the articles, however this is not essential, and in some cases it may be preferable to have a series of stationary articles which are scanned by a moving source and detector.

Preferably in the method in accordance with the invention at least the three spacing modules scanned immediately previous to the article are averaged to obtain said average value; and preferably the article signal is compared with the average value by subtracting the logarithm of one from the other to obtain an output directly proportional to the mass of the article.

An embodiment of the invention will now be described by way of example with reference to the accompanying diagrammatic drawing.

Referring to the drawing, a series of open packets 1 are conveyed at a constant speed past a volumetric flask filler 2, from which they are filled with powder to a nominal constant volume. The packets 1 are spaced apart by aluminum block spacers 3 which also serve to deflect any incorrectly directed powder from between the packets. Up to this point the equipment is quite standard.

In order to check the weights of the packets, to control the rate of feeding from the filler 2 in dependence on weight, and to reject packets which are underweight, a radiation weight measuring and controlling system is provided.

This system comprises a gamma ray source $g$ which is arranged to direct a collimated beam of gamma radiation onto a detector (scintillation counter) in the form of a plastic crystal and associated photomultiplier $p$. The output signal from the photomultiplier, which will be dependent on the absorption characteristics of objects which pass through and attenuate the beam, is then fed, with the required signal processing which is to be explained later, along the paths indicated by arrow heads. There are basically two paths, the first of which is indicated by single and then double arrows and which forms a feedback loop for control of the flask filler 2 via a controller $b$, and the second of which is indicated by single, when it is common to the first path, and then treble arrow heads and forms a feedback loop for rejection of underweight packages, via a reject mechanism $r$.

Referring now to the particular mode of signal processing utilized, it will be appreciated that in accordance with the present invention the instrument is to compare the signal due to each packet with an average value derived from the signals due to the block spacers (i.e., the spacing modules).

The signal produced by the photomultiplier will be equal to a current I of Ioe where Io is the number of counts/sec. due to the source in the absence of a radiation absorber, $\mu$ is the absorption coefficient of the material through which the beam passes and $m$ the mass of this material. At certain times the signal I will be dictated by the mass and absorption characteristics of the blocks and at other times by the mass and absorption characteristics of the material to be measured. This gives two separate quotations:

$Ib = Ioe^{-\mu_b m_b}$ where $b$ indicates the values due to blocks and
$Ip = Ioe^{-\mu_p m_p}$ where $p$ indicates the values due to packets.

From these two equations the quantity Io can be eliminated and thus a value for $mp$ can be obtained which is independent of variations in the source strength and detection sensitivity. This value can be shown to be given by $mp = [\log Ib - \log Ip + K_1]K_2$ where $K_1$ and $K_2$ are two constants dependent on the known quantities in the initial equations, i.e., the mass and absorption characteristics of an average block spacer and the absorption characteristics of the material being weighed.

Referring back to the drawing, the signal from the photomultiplier $p$ which will be a negative waveform corresponding alternately to the absorption due to the masses of the block spacers and packets respectively, is fed to a smoothing filter $f$. In this filter, high-frequency variations due to noise are smoothed out and the signal is then fed to amplifier $a$ where the signal is amplified and inverted into a positive waveform.

The signal then passes to a logging amplifier, which conveniently may be a solid-state operational amplifier with a log function generating feedback module, where the logarithms of the signals due to the packets and spacers are taken.

The logged signals are then fed to a circuit which obtains the average value of the block spacer signal and subtracts it from the signal due to each packet.

The circuit comprises a low leakage storage capacitor C, a charging resistor R, a mercury wetted reed switch Q and a preset voltage source V. The reed switch Q is controlled via a synchronization unit $s$ in dependence on a rotary cam which is directly coupled to the conveying mechanism for the packets, the control causing the switch to be closed during passage of each block spacer through the measuring beam.

The value of the preset voltage V and the time constant of the RC circuit are chosen so that during the closed periods of the reed switch Q the average value of the log block spacer signal is impressed as a voltage across the capacitor C. Then, during occurrence of each packet signal, this log packet signal will have the average block signal subtracted from it as it passes through the circuit to the next stage, i.e., to the point marked X on the figure.

At the point X the signal will now be representative of packet weight per unit length at the appropriate times and will be directed along two paths, one of which (double arrows) will be for control of the filler 2 and the other (treble arrows) to check weigh and operate the reject mechanism $r$.

Along the first of these paths, as indicated by double arrow heads, the signal is fed to a trend unit $t$, where a signal due to the weight trend of the packets is obtained and fed via the controller $b$ at which weight trend is compared with a set point, to the flask filler 2 to control the filler in dependence on weight trend. In the trend unit the weight signal from the point X is averaged while a signal from the synchronizing unit $s$ ensures that the unit is inoperative at the intervals of block passage. In addition, an empty packet discriminator $u$ connected between the output of the amplifier $a$ and the trend unit $t$ ensures that grossly underweight or empty packets do not upset the averaging of packet weights and hence control of the machine.

The true packet weight signal at the point X is also fed to a check weighing unit $w$. This unit $w$ integrates the packet weight signal during the time of the passage of the packet through the gamma ray beam to obtain a value for the total weight of each packet and compares the total weight with a set point to obtain a positive or negative signal depending on whether the packet is over or underweight. This operation is controlled by a signal from the synchronizing unit $s$ in dependence on the timing of passage of spacers and packets respectively so as to cause the weighing unit $w$ to (a) ignore the signal from X during the intervals of block passage (b) to sum the weight during the intervals of packet passage, (c) for an initial period of the intervals of block passage to feed the totalized weight value on to the next stage and (d) for the latter part of each interval of block passage to rezero the weight summing part of the unit.

The signal from the check-weighing unit $w$ may then be fed to a strip chart recorder if desired, and is fed to a discriminator $d$ which detects underweight packets in dependence on the polarity of the signal from the unit $w$, and thereby operates the reject mechanism $r$.

What is claimed is:

1. An apparatus for measuring the masses of a series of articles in which the articles to be measured are spaced by spacing modules of substantially constant radiation absorption characteristics, the apparatus comprising a radiation source and an associated detector for producing signals dependent on the radiation absorption of the articles and spacing modules as they are scanned by being passed sequentially through a beam of radiation between the source and detector, and further comprising signal processing means to compare the signal due to an article scanned by said beam with the average value of a plurality of signals due to spacing modules scanned by said beam, and thereby to obtain an output value dependent on the mass of said article.

2. An apparatus according to claim 1 in which the signal processing means comprises devices for obtaining the logarithm of the said article signal and the logarithm of the average value and for obtaining the difference between said logarithms thereby to obtain an output value directly proportional to the mass of the article.

3. An apparatus according to claim 1 in which the signal processing means comprises an RC circuit consisting of a charging resistor and a storage capacitor in which the signals due to spacing modules are arranged to be impressed across the storage capacitor via the charging resistor to obtain the said average value as a voltage across said storage capacitor.

4. An apparatus according to claim 3 in which the signal processing means comprises devices for obtaining the logarithm of the said article signal and the logarithm of the average value and for obtaining the difference between said logarithms thereby to obtain an output value directly proportional to the mass of the article, and further comprising a switching device for disconnecting the charging resistor from the RC circuit during scanning of an article to obtain as a voltage across said storage capacitor the difference between the logarithms of the article signal and said average value.

5. An apparatus according to claim 4 comprising a preset voltage source which is arranged to be added to the voltage across said storage capacitor via the charging resistor while obtaining said average value voltage, to allow for calibration of the output signal.

6. Apparatus according to claim 1 wherein the radiation source comprises a gamma radiation source and the detector comprises a scintillation counter.

7. A method of measuring the masses of a series of articles in which the articles, while spaced by spacing modules of constant radiation absorption characteristics, are scanned by being passed relatively through a beam of radiation between a radiation source and a detector so that said detector produces signals due to the successive articles and spacing modules, and comparing the signal due to each article with the average value of a plurality of the signals due to spacing modules previously scanned by the beam, to derive a comparison signal which is dependent on the mass of the article.

8. A method according to claim 7 in which the article signal is compared with the average value of the plurality of signals due to the spacing modules by subtracting the logarithm of one from the logarithm of the other, to obtain an output directly proportional to the mass of the article.

\* \* \* \* \*